(12) United States Patent
Ootsuki

(10) Patent No.: US 6,415,695 B1
(45) Date of Patent: Jul. 9, 2002

(54) METHOD FOR FORMING SPHERICAL CONCAVE SURFACES

(75) Inventor: Yoshitaka Ootsuki, Gunma (JP)

(73) Assignee: Sanden Corporation, Gunma (JP)

( * ) Notice: Subject to any disclaimer, the term of this patent is extended or adjusted under 35 U.S.C. 154(b) by 92 days.

(21) Appl. No.: 09/632,594

(22) Filed: Aug. 4, 2000

(30) Foreign Application Priority Data

Aug. 6, 1999 (JP) .......................................... 11-223743

(51) Int. Cl.[7] .................................................. B32B 1/00
(52) U.S. Cl. .............................. 82/1.11; 82/1.2; 82/1.5; 82/82
(58) Field of Search ........................... 82/1.11, 1.2, 1.4, 82/1.5, 46, 47, 82

(56) References Cited

U.S. PATENT DOCUMENTS

| | | | | |
|---|---|---|---|---|
| 4,084,458 A | * | 4/1978 | Galley | 82/1.11 |
| 4,313,355 A | * | 2/1982 | Becker et al. | 82/1.11 |
| 4,584,148 A | * | 4/1986 | Rawlings et al. | 82/1.11 X |
| 4,617,845 A | * | 10/1986 | Sasano et al. | 82/1.11 |
| 4,945,792 A | * | 8/1990 | Gardner | 82/1.2 |
| 5,209,145 A | * | 5/1993 | Baudermann | 82/1.5 |
| 5,417,130 A | * | 5/1995 | Dorsch | 82/1.11 |
| 5,765,464 A | | 6/1998 | Morita | |
| 5,950,480 A | | 9/1999 | Fukushima | |
| 6,024,009 A | | 2/2000 | Morita | |

* cited by examiner

*Primary Examiner*—Henry Tsai
(74) *Attorney, Agent, or Firm*—Baker Botts L.L.P.

(57) ABSTRACT

A method for forming a spherical concave surface includes the steps of bringing a tool into contact with a material to be formed, rotating the material around a predetermined axis, and moving the tool in a first direction parallel to a central axis of the tool and in a second direction perpendicular to the first direction for forming the spherical concave surface on the material. The method also may include the steps of forming an acute first angle between the central axis and the predetermined axis, and forming an acute second angle between the central axis and a tangent line parallel to the central axis and passing through a first end point of the spherical concave surface.

4 Claims, 4 Drawing Sheets

METHOD FOR FORMING SPHERICAL CONCAVE SURFACES

BACKGROUND OF THE INVENTION

1. Field of the Invention

The present invention relates to a method for forming a spherical concave surface for supporting a body with a spherical convex surface, and, more specifically, to a method for forming a spherical concave surface suitable for supporting a shoe with a spherical convex surface at an end portion of a piston in an inclined plate-type compressor.

2. Description of Related Art

In a known inclined plate-type compressor, generally a pair of shoes each having a spherical convex surface engage an end portion of a piston. The rotational movement of an inclined plate rotated by a drive shaft is converted into the reciprocal movement of the piston via the engagement of the shoes with the end portion of the piston and the radial outer surface of the inclined plate. The piston compresses fluid by its reciprocal movement. Each shoe may have a flat surface engaging the radial outer side surface of the inclined plate, and a spherical convex surface engaging and supported by a spherical concave surface formed at the end portion of the piston.

FIG. 3 depicts a known inclined plate-type compressor. Each piston 1 is reciprocally inserted into corresponding cylinder bore 2 formed in cylinder block 3. Crank chamber 4 is formed by cylinder block 3 and front housing 5. Drive shaft 6 extends through crank chamber 4, and is rotatably supported by cylinder block 3 and front housing 5. Inclined plate 7 rotates integrally with drive shaft 6 via rotor 8 and may form a variable inclined plate angle with drive shaft 6. The radial outer portion of inclined plate 7 runs through groove 11 formed at the end portion of piston 1, when inclined plate 7 rotates. A pair of shoes 9 are provided at the end portion of piston 1. Each shoe 9 has flat surface 9a slidably engaging the radial outer side surface of inclined plate 7, and spherical convex surface 9b slidably engaging and supported by a pair of spherical concave surfaces 1a and 1b formed at the end portion of piston 1. The rotational movement of inclined plate 7 is converted into the reciprocal movement of each piston 1 via the pair of shoes 9.

FIG. 4 depicts a known method for forming spherical concave surfaces 1a and 1b at the end portion of piston 1. Groove 11, through which the radial outer portion of inclined plate 7 passes, is provided at the end portion of piston 1. Cutting edge 14 of tool 12 (a cutting tool) is brought into contact with an inner side surface of groove 11. At that time, central axis L2 of supporting base 13 of tool 12 is set parallel to central axis L1 of groove 11. With tool 12 and piston 1 in this relative orientation, and while piston 1 is rotated around central axis L1 of groove 11, tool 12 is moved concordantly in first direction Y parallel to axis L2 of supporting base 13 of tool 12 and in second directions X1 and X2 perpendicular to first direction Y. During this method, cutting edge 14 of tool 12 moves along an arced path, so that it moves from point P1 to point P3 through point P2. In such a manner, spherical concave surfaces 1a and 1b are formed about central axis L1 of groove 11.

In the above-described known forming method, however, when cutting edge 14 passes through point P2, the moving direction of supporting base 13 changes from direction X2 to direction X1. Namely, when cutting edge 14 is moved along the arced form of spherical concave surface 1a, although supporting base 13 is moved in direction X2 as cutting edge 14 forms a portion between points P1 and P2, supporting base 13 is moved in direction X1 as cutting edge 14 forms a portion between points P2 and P3.

Consequently, a sudden recoil may occur in a power transmitting mechanism of a controlling machine (not shown) for moving supporting base 13 when the direction of movement changes from direction X2 to direction X1 at point P2. The generation of such a sudden recoil may not achieve a proper movement of cutting edge 14, and spherical concave surfaces 1a and 1b may not be formed in the desired target shapes.

SUMMARY OF THE INVENTION

Accordingly, it is an object of the present invention to provide an improved method for formig a spherical concave surface in a desired shape without generating a sudden recoil in a controlling machine.

It is another object of the present invention to provide an improved method for forming a spherical concave surface suitable for supporting a shoe with a spherical convex surface at an end portion of a piston in an inclined plate-type compressor.

To achieve the foregoing and other objects, a method for forming a spherical concave surface according to the present invention is herein provided. The method for forming a spherical concave surface comprises the steps of bringing a tool into contact with a material to be formed, rotating the material around a predetermined axis, and moving the tool in a first direction parallel to a central axis of the tool and in a second direction perpendicular to the first direction for forming the spherical concave surface on the material about the predetermined axis. In this method, a first angle of the central axis of the tool relative to the predetermined axis is selected to be greater than or equal to, i.e., not less than, a second angle of a tangent at a first end of the spherical concave surface in a cross-sectional plane including the predetermined axis relative to the predetermined axis.

Further, the present invention provides a method for forming a spherical concave surface on an end portion of a piston of an inclined plate-type compressor. The method comprises the steps of: providing a groove on the end portion of the piston, in which groove the depth direction extends along a predetermined axis; bringing a tool into contact with an inner side surface of the groove; rotating the piston around the predetermined axis; and moving the tool in a first direction parallel to a central axis of the tool and in a second direction perpendicular to the first direction for forming the spherical concave surface on the inner side surface of the groove about the predetermined axis. The groove is adapted to receive a radial outer portion of a rotating inclined plate. In this method, a first angle of the central axis of the tool relative to the predetermined axis is selected to be greater than or equal to, i.e., not less than, a second angle of a tangent at a first end of the spherical concave surface in a cross-sectional plane including the predetermined axis relative to the predetermined axis.

In the method, the tool is moved in a single direction along the second direction while the tool is moved in a single direction along the first direction.

In the method according to the present invention, because the first angle is greater than or equal to, i.e., not less than, the second angle, the tool may be moved only in one direction, that is the second direction, when the spherical concave surface is formed. Because the moving direction of the tool does not change, a sudden recoil does not occur when the tool is moved by a power transmitting mechanism of a forming machine. A cutting edge of the tool may be moved along a properly arced route along a spherical concave surface to be formed, without any undesirable variation. Consequently, the spherical concave surface may be accurately formed in a desired target shape.

Further objects, features, and advantages of the present invention will be understood from the following detailed description of preferred embodiments of the present invention with reference to the accompanying figures.

BRIEF DESCRIPTION OF THE DRAWINGS

Embodiments of the invention now are described with reference to the accompanying figures, which are given by way of example only, and are not intended to limit the present invention.

DETAILED DESCRIPTION OF PREFERRED EMBODIMENTS

Figure 3:
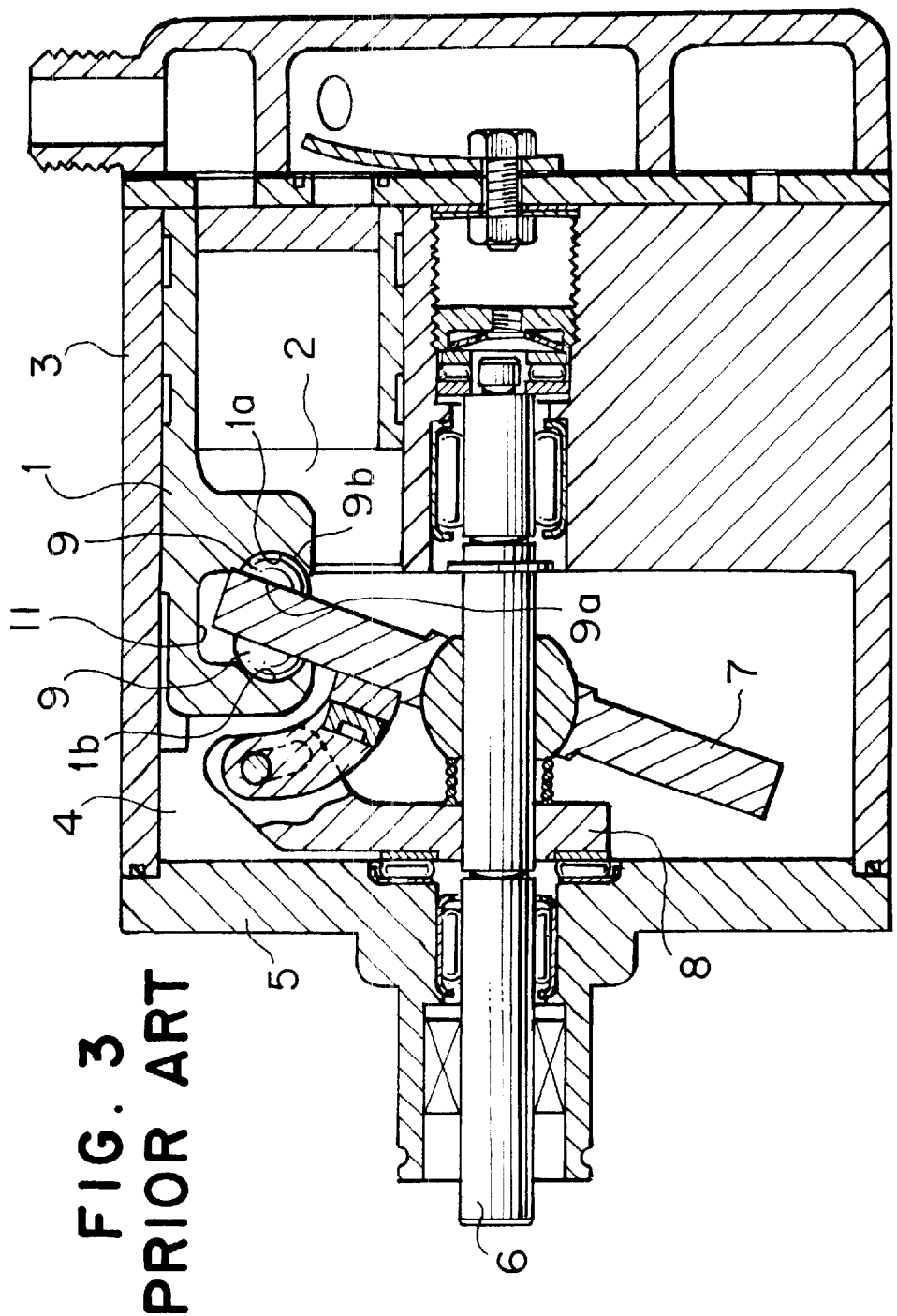
FIG. 3 is a vertical, cross-sectional view of a known inclined plate-type compressor.
Figure 4:
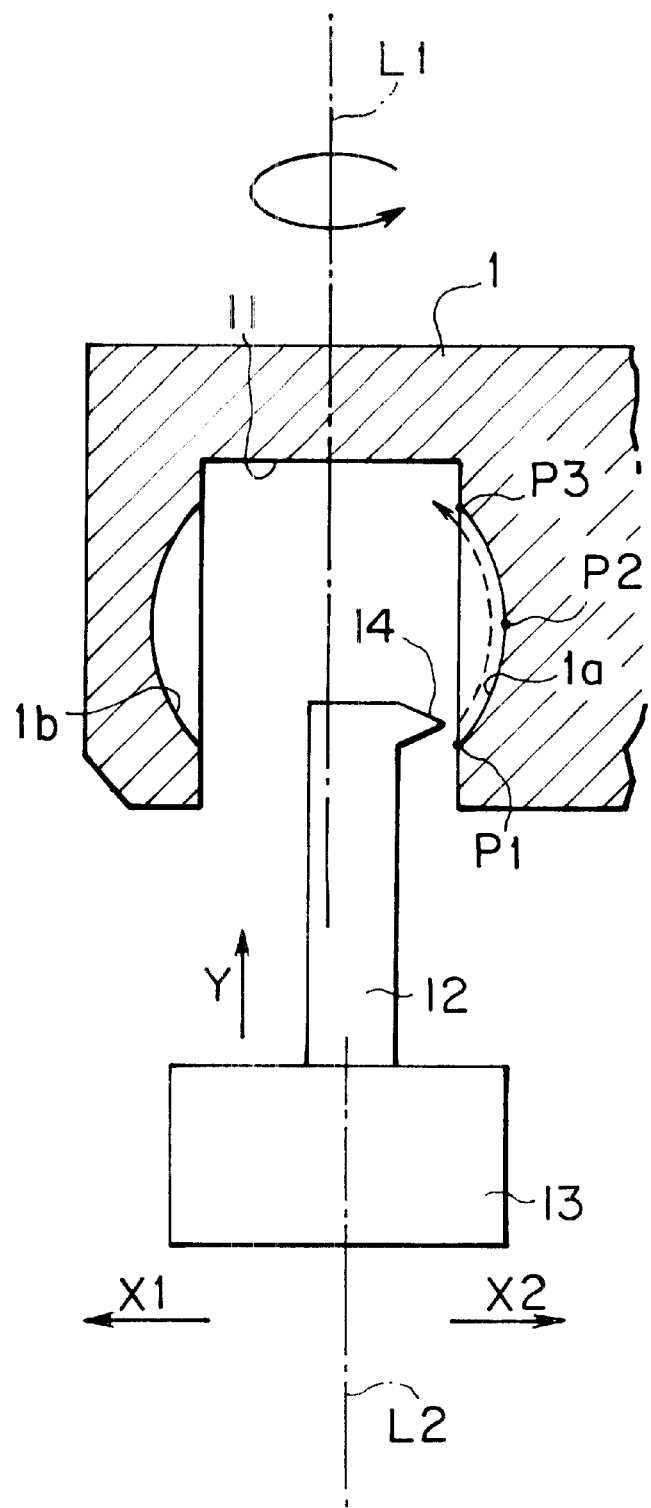
FIG. 4 is a cross-sectional view of an end portion of a piston of an inclined plate-type compressor, showing a known forming method.

The structure of an inclined plate-type compressor itself may be the same as, or similar to, that of a known compressor, such as depicted in FIG. 3. Therefore, the following description shall focus on methods for forming a spherical concave surface for supporting a shoe.

Figure 1:
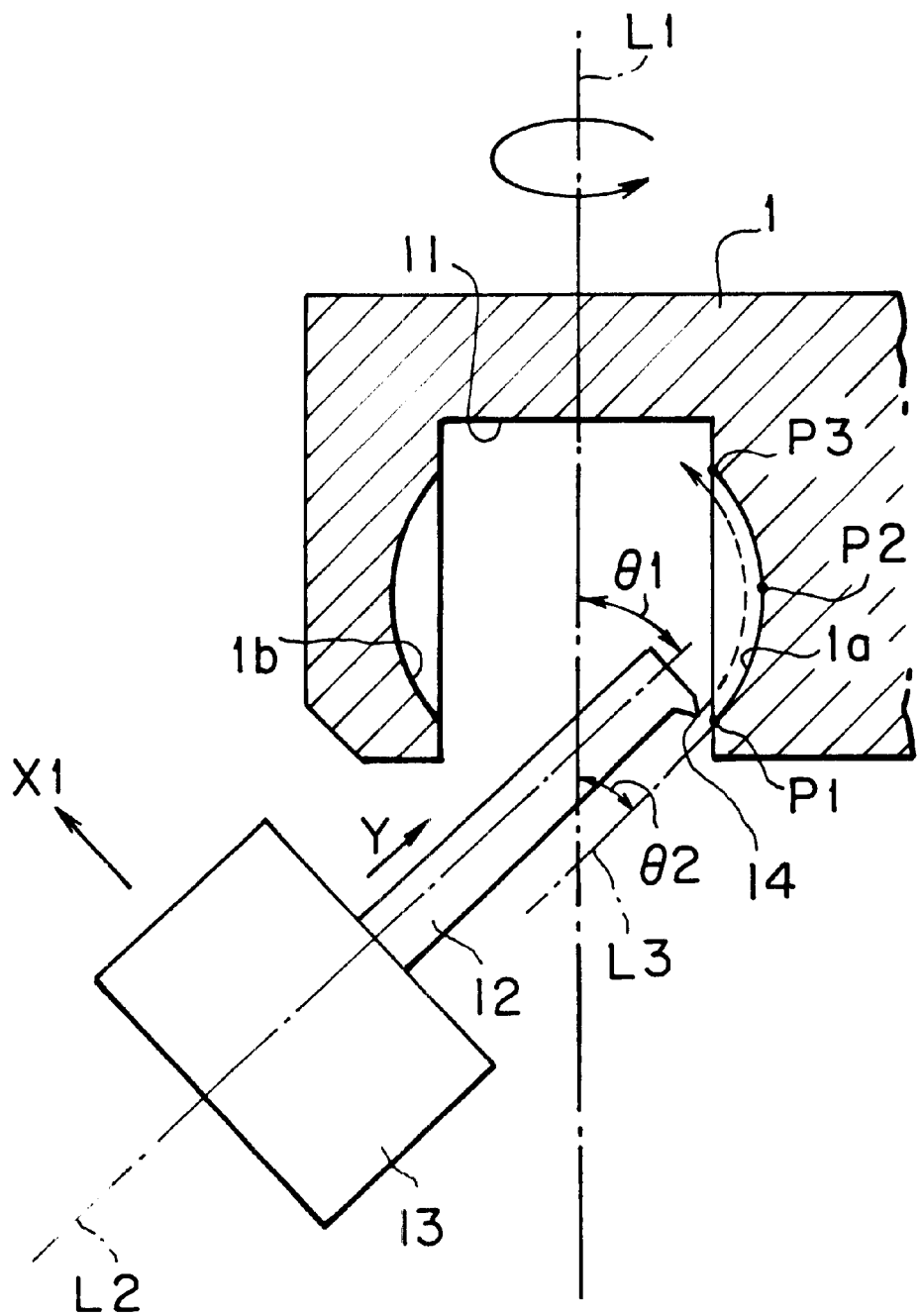
FIG. 1 is a cross-sectional view of an end portion of a piston of an inclined plate-type compressor, showing a forming method according to an embodiment of the present invention.

Referring to FIG. 1, a pair of spherical concave surfaces 1a and 1b are formed on an end portion of piston 1 for supporting a pair of shoes each having a spherical convex surface (compare to FIG. 3). Groove 11 is formed on the end portion of piston 1. Central axis L1 of groove 11 is selected as a predetermined axis. The radial outer portion of an inclined plate (compare to FIG. 3) is inserted into groove 11, and the radial outer portion of the rotating inclined plate runs through groove while engaging the end portion of piston 1 via the pair of shoes.

Cutting edge 14 of tool 12 is brought into contact with the inner side surface of groove 11, such that an acute first angle $\theta_1$ formed between central axis L2 of supporting base 13 and central axis L1 of groove 11 is greater than or equal to an acute second angle $\theta_2$ formed between central axis L1 and a line L3 which is parallel to central axis L2 and passes through a first end point P1 of spherical concave surface 1a. With tool 12 and piston 1 in this relative orientation, and while piston 1 is rotated around central axis L1 of groove 11, tool 12 and supporting base 13 are moved concordantly in a first direction Y parallel to central axis L2 of supporting base 13, and in a second direction X1 perpendicular to first direction Y. Such rotation of piston 1 and movement of tool 12 forms concave surface 1a as a spherical concave surface for slidably supporting a spherical convex surface of a shoe. Spherical concave surface 1b is formed in the same manner.

In this method, cutting edge 14 moves from first end point P1 to a second end point P3 and passes through intermediate point P2 along an arced route. Because first angle $\theta_1$ is greater than or equal to second angle $\theta_2$, tool 12 continuously moves in the second direction X1 without moving in the direction opposite the second direction, i e., tool 12 does not move in direction X2. Therefore, a sudden recoil does not occur in a power transmitting mechanism of the controlling machine. Consequently, spherical concave surfaces 1a and 1b may be formed properly and accurately in a desired spherical concave shape without any undesirable variation.

Figure 2:
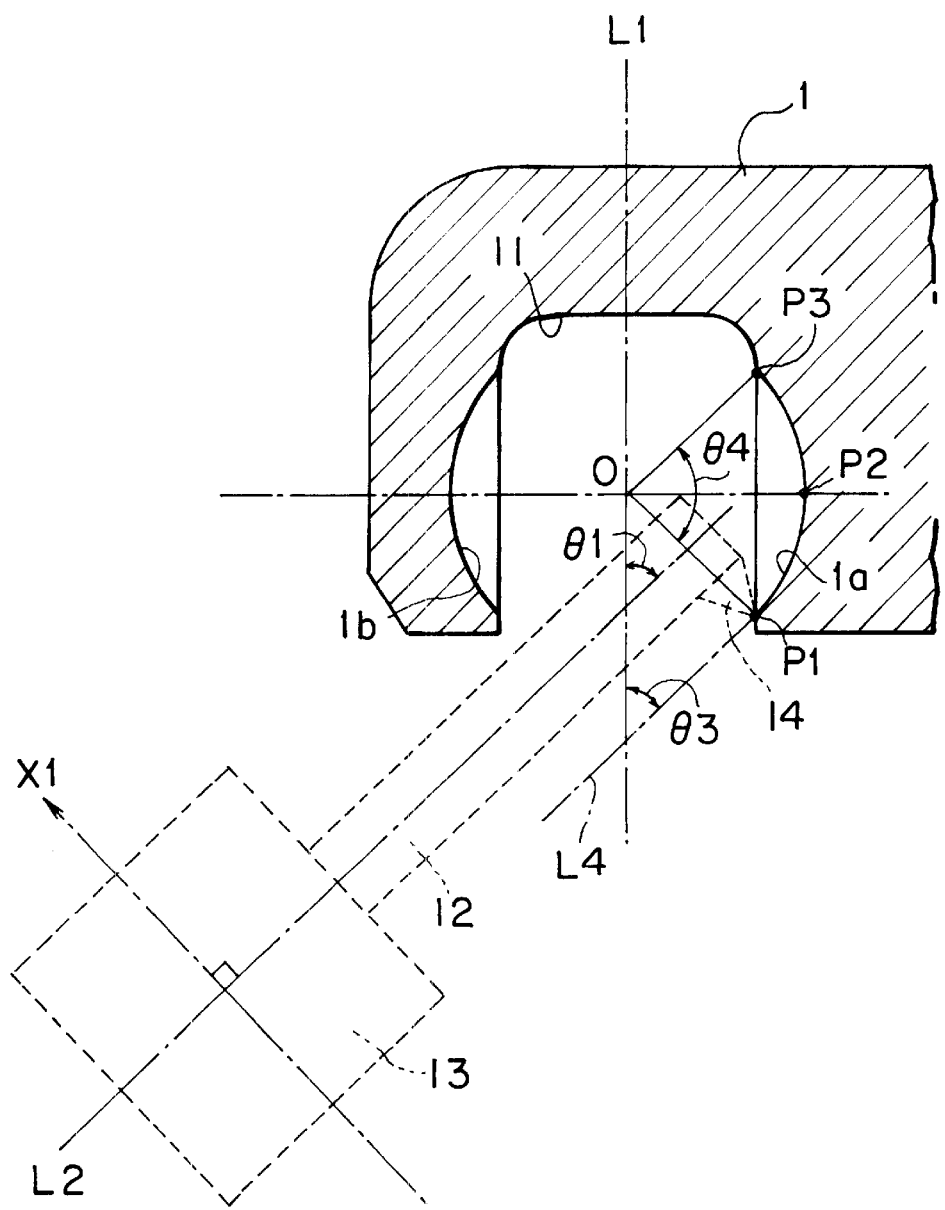
FIG. 2 is a cross-sectional view of an end portion of a piston of an inclined plate-type compressor, showing the method depicted in FIG. 1 from another point of view.

Referring to FIG. 2, the above-described first angle $\theta_1$ is explained from another point of view.

A line extending parallel to central axis L2 of supporting base 13 from the tip of cutting edge 14 is defined as line L4. An acute angle formed between line L4 and central axis L1 of groove 11 is defined as angle $\theta_3$, and an angle $\theta_4$ is formed between a first line passing through first end point P1 and a second line passing through second end point P3. Moreover, the first line and the second line are formed such that the first line, the second line, and a third line formed perpendicular to center axis L1 and passing through intermediate point P2 intersect at a point "O" along center axis L2. When supporting base 13 is inclined, such that the following equations (1) and (2) are satisfied, a sudden recoil does not occur in a power transmitting mechanism of the controlling machine.

$$90° \geq \theta_4 \geq 0 \tag{1}$$

$$\theta_3 \geq (\theta_4)/2 \tag{2}$$

When central axis L2 of supporting base 13 is inclined relative to central axis L1 of groove 11, even if cutting edge 14 is moved along the arced route from point P1 to point P3, supporting base 13 moves in one direction X1. Therefore, when cutting edge 14 passes through point P2, variation in the forming of spherical concave surface 1a or 1b does not occur.

Although the forming of spherical concave surfaces 1a and 1b for supporting shoes at the end portion of piston 1 in an inclined plate-type compressor has been described, the method according to the present invention may be applied to the forming a spherical concave surface on a variety of materials.

Although embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. A method for forming a spherical concave surface comprising the steps of:

bringing a tool into contact with a material to be formed;

rotating said material around a predetermined axis;

continuously moving said tool in a first direction parallel to a central axis of said tool and in a second direction perpendicular to said first direction during a formation of said spherical concave surface on said material;

forming an acute first angle between said central axis and said predetermined axis; and forming an acute second angle between said central axis and a tangent line, wherein said tangent line is parallel to said central axis and passes through a first end point of said spherical concave surface wherein said acute first angle continuously is greater than or equal to said acute second angle.

2. The method of claim 1, wherein said tool does not move in a direction opposite said second direction during said formation of said spherical concave surface.

3. A method for forming a spherical concave surface on an end portion of a piston of an inclined plate-type compressor comprising the steps of:

forming a groove within said end portion of said piston, wherein said groove extends along a predetermined axis; bringing a tool into contact with an inner side surface of said groove;

rotating said piston around said predetermined axis;

continuously moving said tool in a first direction parallel to a central axis of said tool and in a second direction perpendicular to said first direction during a formation of said spherical concave surface on said material;

forming an acute first angle between said central axis and said predetermined axis; and forming an acute second angle between said central axis and a tangent line, wherein said tangent line is parallel to said central axis and passes through a first end point of said spherical concave surface, wherein said acute first angle continuously is greater than or equal to said acute second angle and said groove is adapted to receive a radial outer portion of a rotating inclined plate.

4. The method of claim 3, wherein said tool does not move in a direction opposite said second direction during said formation of said spherical concave surface.

* * * * *